(12) United States Patent
Talamini et al.

(10) Patent No.: US 11,441,042 B2
(45) Date of Patent: Sep. 13, 2022

(54) ENHANCED LABEL SECURITY FEATURES

(71) Applicant: FLEXcon Company, Inc., Spencer, MA (US)

(72) Inventors: John J. Talamini, Sturbridge, MA (US); Ronald Ducharme, Dudley, MA (US); Tori Miller, Worcester, MA (US); Alexis L. Hueglin, Worcester, MA (US)

(73) Assignee: FLEXCON COMPANY, INC., Spencer, MA (US)

( * ) Notice: Subject to any disclaimer, the term of this patent is extended or adjusted under 35 U.S.C. 154(b) by 185 days.

(21) Appl. No.: 15/804,101

(22) Filed: Nov. 6, 2017

(65) Prior Publication Data

US 2018/0127603 A1 May 10, 2018

Related U.S. Application Data

(60) Provisional application No. 62/418,748, filed on Nov. 7, 2016.

(51) Int. Cl.
| | |
|---|---|
| *C09D 11/03* | (2014.01) |
| *C09D 11/037* | (2014.01) |
| *C09J 11/08* | (2006.01) |
| *C09J 11/04* | (2006.01) |
| *C09D 5/33* | (2006.01) |
| *C09J 7/38* | (2018.01) |

(52) U.S. Cl.
CPC ............. *C09D 11/03* (2013.01); *C09D 5/004* (2013.01); *C09D 11/037* (2013.01); *C09J 7/38* (2018.01); *C09J 11/04* (2013.01); *C09J 11/08* (2013.01)

(58) Field of Classification Search
CPC ...... C09D 11/07; C09D 11/037; C09D 5/004; C09J 7/38; C09J 11/04; C09J 11/08
See application file for complete search history.

(56) References Cited

U.S. PATENT DOCUMENTS

| | | | | |
|---|---|---|---|---|
| 5,441,809 | A | * | 8/1995 | Akhter ............... H05F 3/00 428/354 |
| 5,582,434 | A | | 12/1996 | Skov et al. |
| 5,588,679 | A | | 12/1996 | Skov et al. |
| 8,488,842 | B2 | | 7/2013 | Wood et al. |
| 2002/0191234 | A1 | * | 12/2002 | Ishimoto ............... G09F 3/0291 359/1 |
| 2004/0028895 | A1 | * | 2/2004 | Yamakami ............... B32B 27/08 428/354 |
| 2005/0008809 | A1 | * | 1/2005 | Miller ............... B29C 45/14811 428/40.1 |
| 2006/0035077 | A1 | * | 2/2006 | Husemann ............... C09J 7/22 428/354 |
| 2006/0159920 | A1 | * | 7/2006 | Reynders ............... C09C 1/0018 428/402 |
| 2006/0234014 | A1 | * | 10/2006 | Liu ............... C09J 7/38 428/195.1 |

(Continued)

FOREIGN PATENT DOCUMENTS

GB        2001079 A * 1/1979 ............. B44C 1/105

*Primary Examiner* — Laura C Powers
(74) *Attorney, Agent, or Firm* — Brian M. Dingman

(57) ABSTRACT

A composite, comprising a substrate with two surfaces, and a dried or cured coating over at least a portion of one surface of the substrate, where the coating comprises a mixture of a polymeric binder and particles comprising at least one of: colored particles, reflective particles, and diffractive particles.

19 Claims, 3 Drawing Sheets

(56) References Cited

U.S. PATENT DOCUMENTS

2007/0166536 A1\* 7/2007 Dollase ................. C08J 7/04
        428/343
2008/0131697 A1\* 6/2008 Solano ................. B44C 3/02
        428/364
2008/0171144 A1\* 7/2008 Raksha ................. B41M 3/005
        427/162

\* cited by examiner

ENHANCED LABEL SECURITY FEATURES

CROSS-REFERENCE TO RELATED APPLICATION

This application claims priority of Provisional Application 62/418,748 filed on Nov. 7, 2016.

BACKGROUND

This disclosure relates to printed labels for products and the like.

Counterfeiting products is all too common in today's economy, ranging from children's toys, electronic products, sporting goods, cosmetics, OTC and prescription drugs, etc. It has become increasingly important to secure authentic products and documents from the counterfeits.

Some product labels include anti-counterfeiting measures. Anti-counterfeiting labels should be difficult to replicate. To be practical, the labels need to be able to be authenticated, preferably by the end consumer.

To be useful, even at the consumer level, anti-counterfeiting labels must take into consideration who the counterfeiters are, that is, recognize the differences between a well-financed counterfeiting group vs. a less sophisticated counterfeiter. The payoff for a passable counterfeit product most often attracts very capable counterfeiters. Thus, the first level in labeling security is to understand what level of sophistication would be attracted to a given product, for that sets the minimum level of label security needed.

Also, upon defining the level and complexity of security needed, the next question is who and how would verify that a given label is secure?

Sophisticated holographic materials with many levels of complexity are sometimes used in these types of applications. The complexities involved in replicating them makes them very difficult to replicate. Unfortunately, it is this very complexity that makes it very difficult for many professionals, not to mention the average consumer, to verify the authenticity of a product label.

Recently, there have been very sophisticated security labels which offer a way to have both extreme difficulties in counterfeiting by making each label singularly unique, and reasonably easy for even the consumer to verify its authenticity.

Unique identification labels have been a long-sought goal.

One particularly interesting way to uniquely mark a label is to incorporate colored flakes such that a defined area of the label can be recorded, photographed for example. That data can then be incorporated in a database along with the specific product information of the item being protected. This identifying mark can be used to authenticate the product's identity along the distribution chain even by the consumer, given certain online apps on devices such as a cell phone. The colored flakes are randomly dispersed within the authentication area, thus allowing for a unique color "code" for every label.

However, a flaw in this arrangement is that the colored particle dispersion could be replicated, using a color copier for example. The replication could be incorporated as part of a counterfeit label which if read by a cell phone for example, might find the label authentic.

Other methods of replicating these types of labels would be to make a digital copy, from the very data used to scan and verify an authentic label, and use that to color print additional labels.

One such label which has the potential to meet the uniqueness and be widely capable of being reasonably easy for almost anyone to verify the authenticity is available from Covectra, Inc., of Westborough, Mass., as described in Wood et al., U.S. Pat. No. 8,488,842. This label material has as part of its composition a defined area of colored particles in a random order, clearly visible through the transparent substrate of the label. Thus, by the specific location of each of the colored particles in the defined "read area" a singularly unique label is created. The "read area" is then digitally photographed and merged with a specific product, a prescription medication for example, then the information is stored in the manufacturer's database.

To verify the material, merely digitally photograph the "read area," go on line, which references the product database, and obtain confirmation of the legitimacy of the label and consequently the product.

SUMMARY

All examples and features mentioned below can be combined in any technically possible way.

One way to increase the difficulty in replicating a label which is composed, at least in part, of randomly dispersed colored particles, is to incorporate reflective particles into the mix. These reflective particles can be, for example, plain metal flakes, or metallized flakes, that are commonly available in decorative inks, or flakes with an embossed optical grating in their structure, or colored or reflective fibers.

The effect of having such reflective particles as part or all of the colored particle "code" rests in their resistance to being replicated. Highly reflective particles, such as metal or metallized particles, for example, copy (e.g., copying by scanning or photocopying) as dark, black, spots.

Label copy prevention can be enhanced if some or all of the reflective particles (whether they are metallic or not) contain a diffraction pattern such as is commonly produced by micro-embossing. In this case a viewer will see multicolored particles which also appear black upon copying. Diffraction patterns can be produced on metallic and non-metallic particles.

In one aspect, a composite includes a substrate with two surfaces, and a dried or cured coating over at least a portion of one surface of the substrate where the coating comprises a mixture of a polymeric binder and particles comprising at least one of: colored particles, reflective particles, and diffractive particles.

Embodiments may include one of the above and/or below features, or any combination thereof. The polymeric binder may comprise a pressure sensitive adhesive (PSA). The coating may comprise a dried or cured emulsion containing the particles, or a dried or cured solvent solution containing the particles. The coating may be cured using an electron beam radiation system, or an ultraviolet or light-emitting diode-based light system. The substrate may have an unprinted side, and the coating may be laminated to the unprinted side of the substrate. The substrate may have a printed side, and the coating may be laminated to the printed side of the substrate.

Embodiments may include one of the above and/or below features, or any combination thereof. The coating may be laminated to both sides of the substrate. One side of the substrate may be printed before the coating is laminated to the printed side. The composite may further include a protective overcoat, such as a radiation-cured protective overcoat. The composite may further include a hologram on or in the composite. The particles can be selected from the group of particles consisting of metal flakes, metallized flakes, flakes with an embossed optical grating, particles with diffraction patterns, colored fibers, and reflective fibers. The composite may further include a release liner on a side of the dried or cured coating. The composite may further include a topcoat over a second surface of the substrate. The composite may further include printing on or underneath the topcoat.

In another aspect, an ink includes a mixture of a polymeric binder and particles comprising at least one of: colored particles, reflective particles, and diffractive particles. The ink may be clear and used as a printed coating.

In yet another aspect a method of making a composite for use as a label includes providing a substrate with two surfaces, mixing a polymeric binder and particles comprising at least one of: colored particles, reflective particles, and diffractive particles, applying the mixture to at least a portion of a surface of the substrate, and drying or curing the applied mixture. The method may further include, after the drying or curing step, applying over at least a portion of the cured mixture at least one of a topcoat and a carrier. The particles may be selected from the group of particles consisting of metal flakes, metallized flakes, flakes with an embossed optical grating, particles with diffraction patterns, colored fibers, and reflective fibers.

In still another aspect, a composite includes an extruded polymeric film and particles contained within the film, the particles comprising at least one of: colored particles, reflective particles, and diffractive particles.

DETAILED DESCRIPTION

A purpose of this disclosure is to add an additional level of security to a label of the type described in the U.S. Pat. No. 8,488,842. Another purpose is to describe how substrates for the labels described in the U.S. Pat. No. 8,488,842 can be made.

One way to counterfeit the label described in the U.S. Pat. No. 8,488,842 may be to photocopy or scan the label and replicate the pattern of colored particles on a clear film or other appropriate substrate.

It has been found that using reflective materials, including but not limited to either metalized and/or diffractive particles, either alone or preferably in combination with colored particles, can add an additional level of anti-counterfeiting protection, as highly reflective or diffractive materials do not scan or copy well; they tend to appear black or grayish when copied.

This disclosure can be implemented in several ways:

EXAMPLE 1

To a solution, or emulsion, or a radiation-curable precursor, or blended into a "hot melt" variant of a polymeric binder or adhesive (the binder can be from the family of pressure sensitive adhesives (PSAs) [PSAs have varying compositions and properties, thus the specific selection is dependent upon the end use requirement]), is mixed a polyester-based diffractive particle, a holographic glitter, or mixed colored particles. Example of appropriate reflective and diffractive particles are flakes available from a source such as Glitterex Corporation, 7 Commerce Drive, Cranford, N.J. 07016. Colored fibers and reflective fibers are available in the marketplace, for example from Flock Tex., Incorporated, 200 Founders Drive, Woonsocket, R.I. The concentration of the particles in the polymeric binder can be adjusted, but generally is less than 20% by weight, preferably less than 5% by weight, and in some cases, less than 0.1% by weight.

A typical, but by no means required concentration level of "particles" to adhesive is 2.6 mg/cc, which equals about 0.3% by weight.

Figure 1:
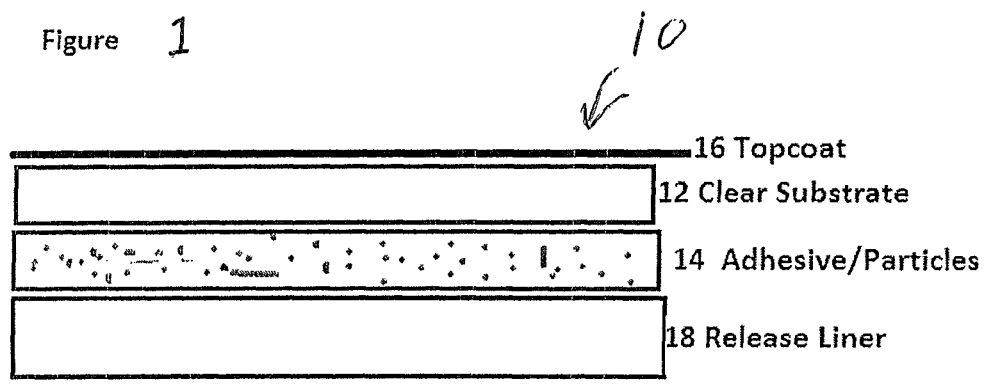
FIG. 1 is an enlarged side view of a label with enhanced security.

FIG. 1 shows a label 10 according to this disclosure. Label 10 can be made as follows. An adhesive/particles blend 14 is applied to one, or two, faces of an appropriate transparent substrate 12, e.g., a polyester, or polyolefin, or PVC or other clear film substrate. The exact choice of substrate would be defined by the requirements of the label. The blend is then dried or cured/hardened in an appropriate manner, as is known to those skilled in the field. Non-limiting examples of curing include curing using an electron beam radiation system, or a light-based curing system that uses ultraviolet light, or uses light-emitting diodes.

This composite would typically but not necessarily also have an appropriate removable/disposable carrier, allowing the adhesive to be contained between the removable carrier and the transparent substrate. An optional print receptive coating (topcoat) can be applied over the cured adhesive layer; topcoats are known in the field. In a non-limiting example, the topcoat can be a radiation-cured protective overcoat.

This composite could then be printed with whatever information was required on the label (e.g., on the topcoat), leaving some defined area through which examination of the dispersed particles in layer 14 can be made.

FIG. 1 illustrates an exemplary composite 10 comprising a substrate 12 (such as a film, which is typically but not necessarily clear so it can be seen through) covered at least in part by a layer 14 comprising a cured mixture of polymeric binder and one or more particles of the types described above. Topcoat 16 and/or carrier (e.g., release liner) 18 may optionally be applied over some or all of layer 14. Topcoat 16 can also be applied over substrate 12, as shown in the drawing. Printing can be applied on or underneath topcoat 16. Printing can also be applied on either or both faces of substrate 12. For example, the adhesive layer can be applied to a printed side of the substrate. Or a topcoat can be applied to one face of the substrate, and then the exposed face of the topcoat can be printed, and the adhesive layer then applied against the printed face of the topcoat.

There are many other variants on this theme, some but not all of which are described in the following examples. Also, a hologram can be added to the composite in order to further enhance security. The hologram can be added in a desired location, using existing technologies for adding a hologram to a label or other substrate.

EXAMPLE 2

Figure 2:
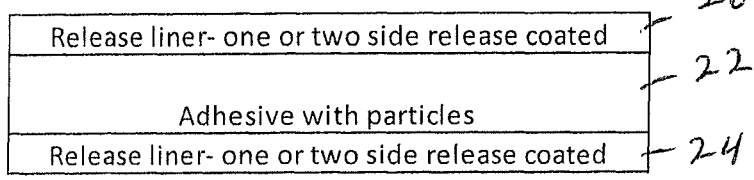
FIG. 2 is an enlarged side view of a transfer tape with enhanced security.
Figure 3:
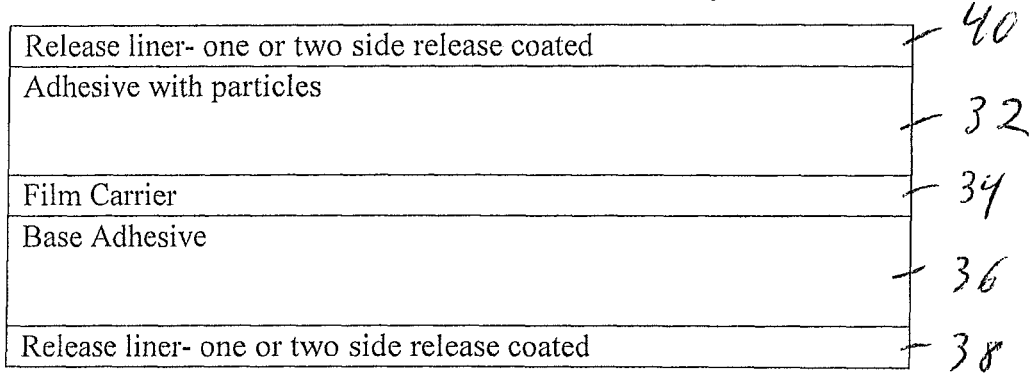
FIG. 3 is an enlarged side view of a double face tape with enhanced security.

Transfer Tape 20 (FIG. 2) or Double Face Adhesive Coated Base Film 30 (FIG. 3)

FIG. 2 details an example of a transfer tape 20 according to this disclosure. A mixture as in example 1, e.g., a PSA with the particle blend, 22, is cast on a removable release liner 24. Both sides of the liner can be release treated (e.g., with a silicone material), such that the adhesive can be cast, dried, and cured, and wound up to a roll, which can then be unwound, and placed in contact with a film so that the PSA will transfer to the film. Alternatively, only one side (the side against the adhesive layer) can be release coated. The film may be printed on the top surface or reverse printed on the side to which the adhesive will be laminated. A release liner 26 may be placed over the top of the cured adhesive layer 22. In some cases, the transfer tape type adhesive may have two release liners of which one will removed prior to or during application to the selected side of the printed label Another form of a transfer tape (double face tape 30, FIG. 3) uses a common film carrier 34 with layers of adhesives (32, 36) on both sides. The particles would be in one (or both) of the adhesive sides. The adhesive on one side is typically but not necessarily used to create a bond to the application surface. Release liners 38 and 40 may optionally be placed over the cured adhesive layers 36 and 32.

EXAMPLE 3

Rather than the use of the adhesive to contain the random particle dispersion, a clear coating that contains the random particle dispersion can be applied to the label substrate and placed on either the side in contact with the adhesive or the side opposite the contact with adhesive. In the latter example, the label substrate material need not be transparent, as the defined area (the area acting as the anti-counterfeiting portion) can still be viewed through the clear coating.

Such clear coats are common in the printing of labels, and are often used as overcoats to protect the printed indicia, as with topcoat 16, FIG. 1.

EXAMPLE 4

A composite as in example 1, with a transparent film, particles dispersed in an adhesive, and a removable liner that is typically release coated on both of its faces, but being self-wound, i.e. without a second removable liner. A transfer tape or a double-faced product (with adhesive on two sides of the film/substrate) can have a single liner (e.g., be self-wound, like a roll of adhesive tape), or two liners. When one liner is used, it typically remains on the product until final processing is complete. When two liners are used, typically one liner is removed when the product is processed, and the second liner remains on until final processing is complete. Variants of this composite/material are also available.

The above example 4 composite can be used to protect printed indicia on the label, much as the clear coat composite cited in example 3.

Further the "defined area" can be either reverse printed on the described composite or on the surface opposite the adhesive/particle dispersion, or printed on the underlying label.

EXAMPLE 5

The label as in example 1, can be made tamper evident, e.g., by employing a film with low elasticity so that removal results in the tearing of the label. This can often be enhanced by die cutting score marks along the edges of the label.

Another method of creating a tamper-evident label composite is to pre-print a discontinuous or patterned "break coat," a coating with limited adhesion to the label substrate on the side of the substrate that will have the adhesive/particles applied to it. Attempts to remove the label will result in part of the adhesive/particles remaining with the removed label and part transferred to the application's surface.

In another variation of this tamper-evident label, reference U.S. Pat. Nos. 5,588,679 and 5,582,434. These patents teach a continuous coating applied over the discontinuous patterned "break coat." The purpose of this coating is to facilitate "reverse printing" of the label such that when viewed through the opposite, top of the film, the printing is viewed in the expected manner. The advantages here are several: no need for either a protective surface coat or over-laminating protective layers. The adhesive/particle mix would then be in contact with the printed layer. Upon attempted removal both the printed indicia and the adhesive/particle mix would separate, part would end up with the label material, and part would end up on the applied surface.

Another variation of this would be to have the particles mixed into the continuous coating, thus allowing for an opaque ink to be the last layer of the reverse printing operation, then applying the adhesive over the printing.

The specific materials for the "break coat" or the continuous print receptive layer would depend upon the substrate used for the label. For example, for a PET-based film substituted acrylics such as poly-acrylic acids are useful. For acrylic films, cellulosic materials are often used for the "break coat." Similarly, for the print-receptive coating, amorphous PET resin is a good PET film choice and amorphous acrylics work well on acrylic films.

EXAMPLE 6

A composite consisting of a base film, a "break coat" over one side of the film, the break coat has mixed in the flake, a thermally softened adhesive applied over the break coat/particle, thus constructing a thermally transferable flake material which can be applied to virtually any label material.

In a variant of this, the break coating does not contain the flake but a separate coating, such as the one from Example 3, could be applied over the break coat and the adhesive layer on top of it.

In this way, the durability of the coating/flake combination could be defined independently of the break coat composition.

EXAMPLE 7

Figure 4:
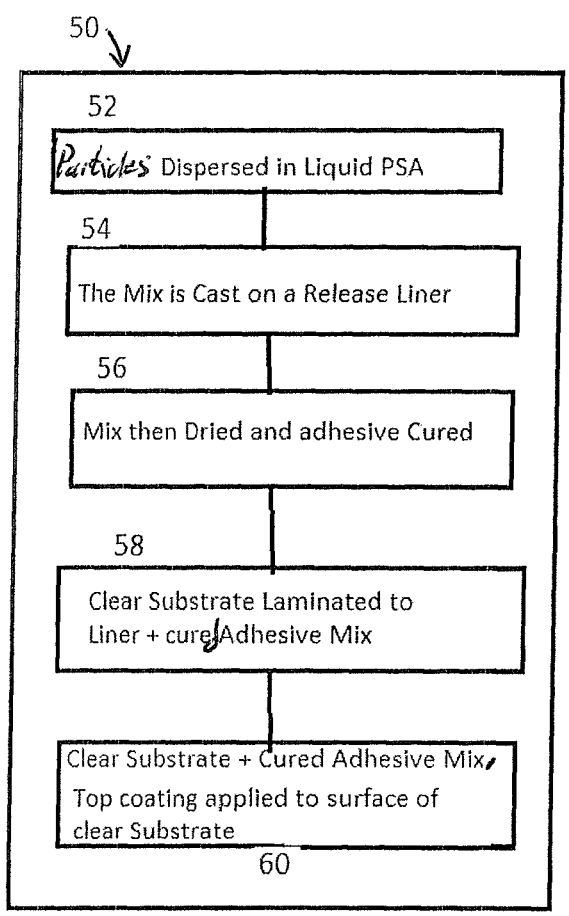
FIG. 4 describes steps of an exemplary method to make a label with enhanced security.

Dispersing the particles in an application-suitable polymeric continuous layer, to form a printing ink. The ink can be printed in a flood coating, or not. The ink can be clear, and the particles can be added to the ink. The ink could be applied wherever required on the label document, driver's license, passports, etc. This ink thus has application outside of the label substrates described herein or in the '842 patent referenced above. The ink can be applied by various methods, including flexographically, screen, or other methods known to the art FIG. 4 illustrates an exemplary method 50 of making a composite of the present disclosure. One or more particles of the type described above are mixed in a polymeric binder (e.g., a PSA), step 52. The mixture is applied to the release liner, step 54. Step 56, the mixture is cured. Curing can be accomplished as necessary given the particular binder used. Step 58, the liner plus cured adhesive mix is laminated to one side of the substrate. Step 60, an optional step, the opposite side of the substrate is coated with a print receptive top coating.

Figure 5A:
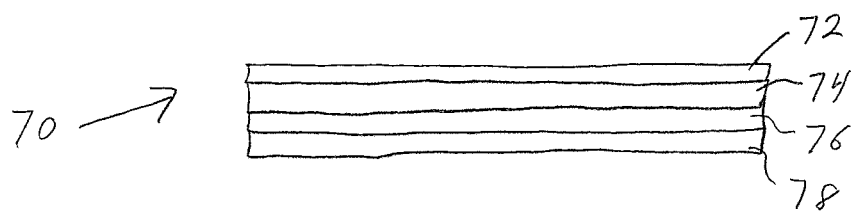
FIGS. 5A and 5B are side and top views, respectively, of a label made from or consisting of the subject composite.
Figure 5B:
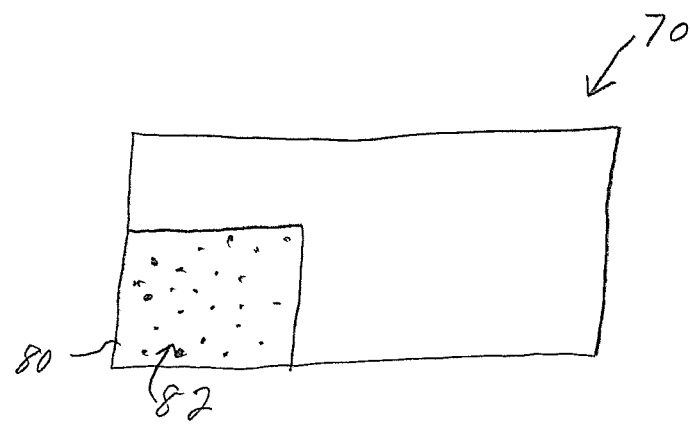

FIGS. 5A and 5B show a label 70, which can be made from or comprise the composite 10 of FIG. 1. Label 70 includes clear topcoat 72 covering the top face of clear substrate 74. Printing (when used) can be applied to the top (exposed) face of topcoat 72, or to the underside of topcoat 72 for reverse-printed applications. Adhesive/particle mixture layer 76 is underneath substrate 74. Removable release liner 78 protects the underside of the adhesive layer. Label 70 can be applied to an article to be labelled (such as a prescription medication container) by removing liner 78 and adhering the resulting label to the container. FIG. 5B is a top view that shows defined area 80 that includes the randomly-oriented particles 82. The particles may be present throughout layer 76 but visible only in area 80 by masking the rest of layer 76, such as by printing a mask on the topcoat everywhere except for area 80.

A number of implementations have been described. Nevertheless, it will be understood that additional modifications may be made without departing from the scope of the inventive concepts described herein, and, accordingly, other embodiments are within the scope of the following claims.

What is claimed is:

1. A product security label, comprising:
a transparent substrate with two surfaces; and
a dried or cured adhesive coating over at least a portion of one surface of the transparent substrate, wherein the dried or cured adhesive coating comprises a mixture of a polymeric binder and reflective flakes that are randomly dispersed in the dried or cured adhesive coating, wherein the reflective flakes make up less than 5% by weight of the dried or cured adhesive coating and are visible through the transparent substrate such that by the specific locations of all of the flakes a visually unique pattern is created.

2. The product security label of claim 1, wherein the polymeric binder comprises a pressure sensitive adhesive (PSA).

3. The product security label of claim 1, wherein the dried or cured adhesive coating comprises a dried or cured emulsion containing the reflective flakes, or a dried or cured solvent solution containing the reflective flakes.

4. The product security label of claim 1, wherein the dried or cured adhesive coating is cured using an electron beam radiation system, or an ultraviolet or light-emitting diode-based light system.

5. The product security label of claim 1, wherein the transparent substrate has an unprinted surface, and wherein the dried or cured adhesive coating is laminated to the unprinted surface of the transparent substrate.

6. The product security label of claim 1, wherein the transparent substrate has a printed surface, and wherein the dried or cured adhesive coating is laminated to the printed surface of the transparent substrate.

7. The product security label of claim 1, wherein the dried or cured adhesive coating is laminated to both surfaces of the transparent substrate.

8. The product security label of claim 7, wherein one surface of the transparent substrate is printed before the dried or cured adhesive coating is laminated.

9. The product security label of claim 1, further comprising a radiation-cured protective overcoat.

10. The product security label of claim 1, further comprising a hologram on or in the product security label.

11. The product security label of claim 1, wherein the reflective flakes are selected from the group of reflective flakes consisting of metal flakes, metallized flakes, flakes with an embossed optical grating, and flakes containing a diffraction pattern.

12. The product security label of claim 1, further comprising a release liner on a side of the dried or cured adhesive coating.

13. The security label of claim 1, further comprising a topcoat over a surface of the transparent substrate.

14. The product security label of claim 13, further comprising printing on or underneath the topcoat.

15. The product security label of claim 1, wherein at least some of the reflective flakes are diffractive.

16. The product security label of claim 1, wherein at least some of the reflective flakes are colored.

17. The product security label of claim 1, wherein at least some of the reflective flakes are metallized or metal.

18. The product security label of claim 1, wherein the reflective flakes make up 0.3% by weight of the dried or cured adhesive coating.

19. The product security label of claim 1, wherein the reflective flakes make less than 0.1% by weight of the dried or cured adhesive coating.

* * * * *